United States Patent [19]

Ahrweiler

[11] 4,017,235

[45] Apr. 12, 1977

[54] APPARATUS FOR AVOIDING AN EXCESS OF PRESSURE IN A CONTINUOUS PRESS

[75] Inventor: Karl-Heinz Ahrweiler, Krefeld, Germany

[73] Assignee: Edward Küsters, Krefeld-Forstwald, Germany

[22] Filed: Oct. 10, 1975

[21] Appl. No.: 621,381

[30] Foreign Application Priority Data

Oct. 30, 1974 Germany .......................... 2451661

[52] U.S. Cl. ................................ 425/149; 100/53; 100/154; 425/154; 425/150; 425/371; 425/406

[51] Int. Cl.² ........................................ B29C 3/06

[58] Field of Search .......... 425/149, 154, 406, 371, 425/150; 100/53, 52, 50, 153, 154

[56] References Cited

UNITED STATES PATENTS

| | | | |
|---|---|---|---|
| 2,267,508 | 12/1941 | Spengler | 425/149 X |
| 2,389,169 | 11/1945 | Stacy | 425/149 |
| 2,805,447 | 9/1957 | Voges | 425/154 |
| 3,248,985 | 5/1966 | Hitchcock et al. | 100/53 X |
| 3,719,445 | 3/1973 | Sindelar | 425/154 X |
| 3,851,685 | 12/1974 | Ahrweiler et al. | 425/371 X |
| 3,881,852 | 5/1975 | Ahrweiler | 425/149 |
| 3,890,413 | 6/1975 | Peterson | 425/149 X |

*Primary Examiner*—Robert L. Spicer, Jr.
*Attorney, Agent, or Firm*—Kenyon & Kenyon Reilly Carr & Chapin

[57] ABSTRACT

A safety device for avoiding excess pressure in a continuous press of the type having two rotatively driven endless conveyor belts forming opposed, substantially linear spans defining a press zone with press platens applying pressure through the travelling spans to work carried therebetween and in which a plurality of hydraulic cylinders or spindles are inserted between the press platens and rigid supports with pressure supplied to the cylinders through a pressure-controlling valve which is sensitive to the movement of the pressure platen to regulate the pressure in the cylinders maintaining a constant platen spacing in which the pressure-controlling valve is coupled to the press platen through a piston and cylinder arrangement having a pressure therein maintained so as to not exceed a pre-determined value whereby pressure in the hydraulic cylinders exceeding that pressure will cause the piston to yield and relieve the pressure.

5 Claims, 3 Drawing Figures

APPARATUS FOR AVOIDING AN EXCESS OF PRESSURE IN A CONTINUOUS PRESS

BACKGROUND OF THE INVENTION

This invention relates to presses of the type wherein two pressure platens are each supported by a support construction so that the forces of each of the press platens are transmitted to their corresponding support construction and in which means are provided to regulate spacing of the press platens including pressure elements positioned between the platen and respective support construction and means provided to regulate the pressure therein, in general, and more particularly, to a safety device for such a press which prevents excessive pressures developing therein.

A press of this general nature is disclosed in U.S. Pat. No. 3,851,658, the disclosure of which is hereby incorporated by reference. Means for maintaining constant spacing in such a press are described in detail in U.S. Pat. No. 3,881,852 which is also hereby incorporated by reference. The press disclosed in these references is a continuous press for the manufacture of wood, chipped wood or the like in which the material to be treated is moved continuously between two flexible endless conveyor belt spans. Between the belt span forming the press zone and the press platens, a plurality of rotatively unpowered endless loops of roller chains are used, these roller chains being packed transversely together to form a bed interposed between the platens and the seal strip conveyor belts. The press platens in turn are positioned between support constructions comprising beam, each positioned transversely to the movement of the belts with portions of such beams extending longitudinally above and below the press platens for the length of a press. Hydraulic pressure cushions or hydraulic cylinders are interposed between the beams and pressure platen to control pressure and maintain the proper spacing. In the second of the above-mentioned references, means for controlling this spacing in the form of a guiding valve arranged so that when the distance between the press platens is at a pre-determined spacing, the valve is inactive and is closed. A pressure pump coupled through the valve causes an increase in the pressure in the pressure elements until the press platens begin to move together changing their position. At that point, the guide valve opens to allow a bleed-off of hydraulic fluid relieving the pressure so that the press platen moves back in a direction to cause it again to be at the pre-determined distance, where upon reaching the pre-determined distance, the valve becomes inactive. Through this arrangement, a dynamic balance about the pre-determined distance between the platens is achieved. Such a design works quite well. However, if the material being compressed for some reason presents to the press a greater resistance to compression than is normal, the pressure in the pressure elements increases. In other words, it increases to maintain the pre-determined spacing. In the press described in the aforementioned Patents where strips of wood chip panels or the like are made, varying compressibility of the materials can result from non-uniformity of the chips supplied. In the zones of denser material, substantially higher pressure is needed to compress to the uniform specified thickness. The aforementioned valve insures that the proper spacing is maintained by increasing the pressure as required.

However, a situation can exist where the necessary pressure to achieve the desired thickness exceeds the stress limits of the machine and can result in structural damage to the machine or associated hydraulic lines. Thus, the need for a device to prevent such damage to the machine becomes evident.

SUMMARY OF THE INVENTION

The present invention provides such a device. In general terms, it provides a safety device which prevents exceeding a specified mean pressure, maintains this maximum pre-determined pressure and still permits the proper control of spacing during normal operation.

In general, the present invention employs a valve of the general type described in the aforementioned patent to maintain proper spacing during normal operation. In other words, this valve operates normally up to the maximum pre-determined pressure. The safety device of the present invention comes into play at that pressure. However, it does not completely relieve the pressure in the machine or shut it down. It simply, in effect, clips off the peak pressure, allowing the apparatus to operate at that pressure until the time when the pressure falls below the maximum, whereupon normal positioning control takes over again. As a result, the only thing that happens is that a small section of the strip being formed will have a greater thickness. The process continues and such material, if the thickness is too excessive can be cut out of the finished strip.

In the illustrated embodiment, using a valve for control whose operation depends on the pressure in the pressure element, the safety device comprises an element interposed between one part of the valve and the pressure platen or its support. Normally, it acts as a rigid member and the operation of the valve is conventional to provide positioning control. However, the safety device is designed so that if the maximum pressure is exceeded, it gives, allowing the pressure platens to move further apart and a new equilibrium is established at this maximum pressure. The system thus becomes a pressure-regulated system.

In principle, the safety device of the present invention may be disposed where desired as long as it transmits the force to the valve. However, for constructional reasons, it is advantageous if it is inserted between the press platen and the part of the valve associated therewith.

In the preferred embodiment, the safety device for transmitting force comprises a hydraulic piston and cylinder unit which is pre-loaded to a pre-determined pressure. Up to this pressure, it remains rigid, but, at pressures exceeding the pre-determined pressure, the piston is able to move in the cylinder. In particular, this object is attained by connecting into the line going to the cylinder a pressure relief valve which will operate at the pre-determined pressure. Thus, upon an overpressure in the press which will be felt in the cylinder, the pressure relief valve acts allowing the cylinder to move until the spacing between the press platens is such that the pressure generated is not above the pre-determined maximum pressure. The use of a pressure relief valve is particularly advantageous in that it can be easily adjusted. In principle, the pre-loading of the arrangement could be accomplished through the use of springs. In the embodiment described, the cylinder is supplied with fluid at a constant pressure from a pump. Connected in the line between the pump and the cylinder is the pressure relief valve. As noted, should an over-pressure occur, it is relieved through the movement of the piston and discharge of fluid through the pressure relief valve. As soon as normal conditions are reestablished, the two press platens will again be moved together and the piston moved to its extreme position in the cylinder, returning the apparatus to a position regulation mode of operation.

DETAILED DESCRIPTION OF THE PREFERRED EMBODIMENT

Figure 1:
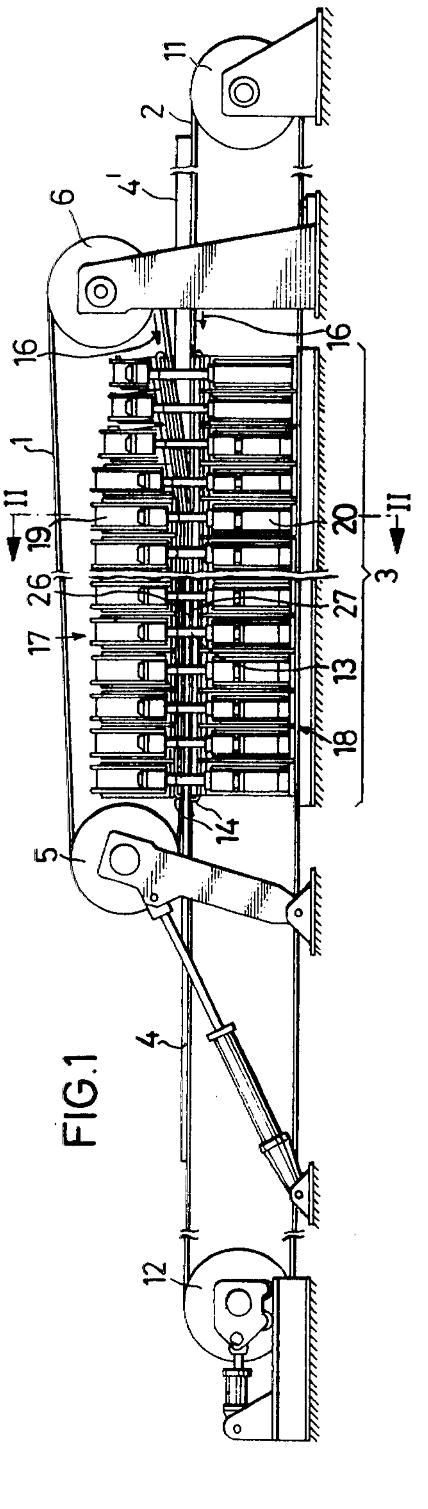
FIG. 1 is a side elevation view of a continuous press in which the present invention is employed.

FIG. 1 shows the upper and lower endless conveyor belt loops 1 and 2 respectively, which form opposed, substantially linear spans defining the pressing zone embraced by the bracket 3. These belts are made of thin strip steel having a thickness of about 1 to 1.5 mm. and are flexible both longitudinally and transversely. The upper belt 1 is looped around rotative drums 5 and 6. The lower belt 2 at one end loops around a rotative drum 11 with the other end of this lower loop passing around a rotative drum 12.

The work 4 enters at the right hand end of the press in FIG. 1 as loose material 4' and comes out the left hand end with a reduced thickness.

The working spans of the two belts in the zone 3 are pressed together by press platens 27 and 26, the lower platen 27 being held against downward motion by individual supports such as transverse I-beams 20 supported by base members which extend longitudinally for the length of the press. The upper platen 26 is supported by individual supports such as transverse I-beams 19 which can be pulled downwardly by suitable actuators. There are a plurality, or series, of these beams 20 and 19 and each of the upper beams 19 is provided with its own pair of actuators 21. The upper beams 19 form an upper support structure 17 and the lower beams 20 a lower support structure 18.

The platens 26 and 27 each extend for the full length of the pressing zone 3 as one piece construction, excepting that, as suggested in FIG. 1, the upper one may be in two sections to define a converging entrance zone for the work so that the latter can receive a gradually increasing pressure as it initially enters the press.

Roller chain loops providing the anti-friction means between these platens and the steel strip conveyor belt spans throughout the pressing zone 3, are generally indicated in FIG. 1 as the roller chains extending between the lower belt 2 and the lower platen 27 and being individually looped by individual looping sprocket wheels approximately positioned and which are unpowered and rotatively freed from one another. It can be seen that these roller chain loops 14, encircle both the lower platen 27 and its supporting beams 20. By lengthening the upper belt loop 1, the same arrangement could be used for the upper roller chain loops 14 which must run between the upper belt loop and the upper platen 26.

This is an arrangement more fully described in U.S. Pat. Nos. 3,851,685 and 3,881,852. As described therein, pressure and, if desired, heat is transmitted through the roller chains 14 and the conveyors 1 and 2 to the strip of material 4.

Figure 2:
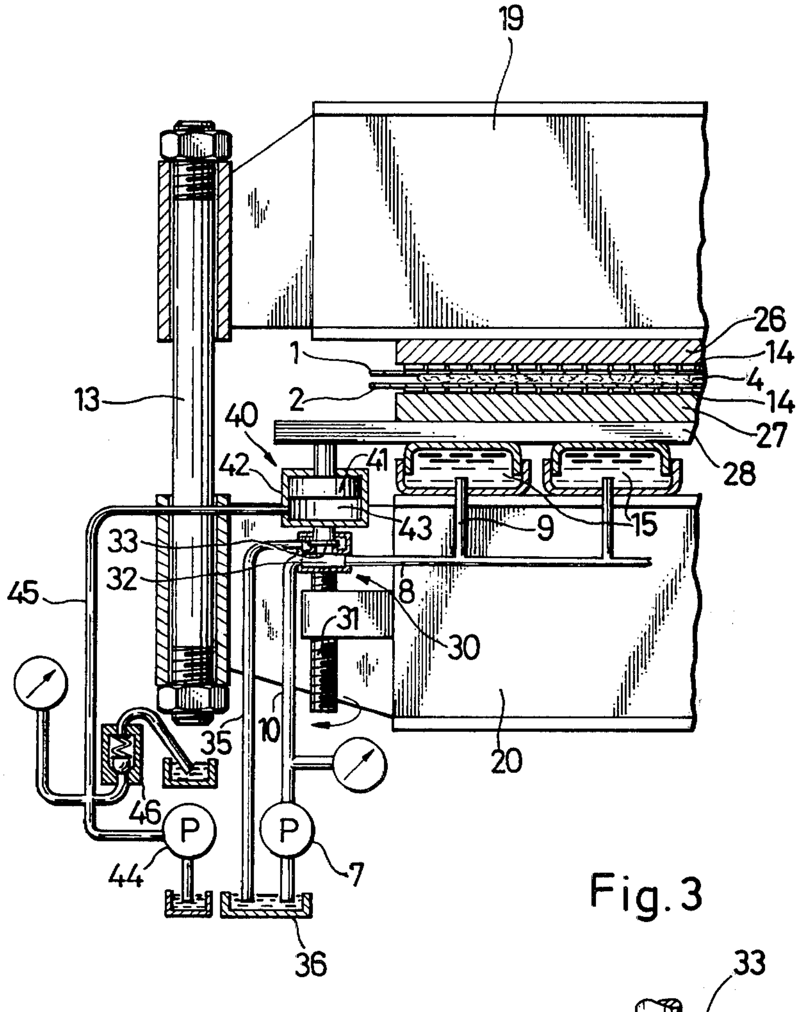
FIG. 2 is a sectional side view of the press taken along the line to 2 of FIG. 1.

FIG. 2 is a view taken along the section II—II of FIG. 1. Each of the individual supports, e.g., transverse I-beams 19 and 20 which are opposite one another above and below the belts 1 and 2 and the strip 4 are clamped together laterally outside the strip by spindles 13, shown on both FIGS. 1 and 2, to permit the formation of individual powerful pressure-applying elements. Thus, as shown on FIG. 2, the spindle 13 couples an upper support beam 19 and lower support beam 20. Disposed between the support beam 20 and the press platen 27 is an intermediate platen 28 and a plurality of individual pressure vessels 15 used for transmitting pressure to the work 4 by lifting platens 27 and 28. Although only two pressure vessels 15, preferably in the form of cylindrical units, are shown, it will be recognized that a plurality will be installed. Furthermore, it is noted that all of these vessels are connected in parallel so as to provide an even pressure over the full surface of the platen.

Figure 3:
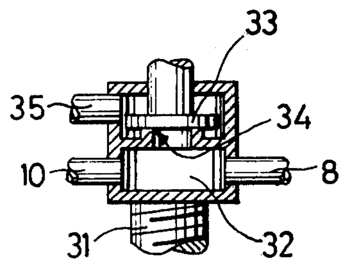
FIG. 3 is a detailed drawing of the control valve of FIG. 1.

The pressure vessels 15 are supplied with hydraulic medium through branch pipes 9 connected to a pipe 8 having its inlet coupled to the outlet of a control valve designated generally as 30. Hydraulic pressure medium is supplied to the valve 30 by a pump 7 over a line 10. Valve 30 includes a lower chamber 32 in communication with the inlet line 10 and the outlet line 8. In addition, it includes an upper chamber coupled to an overflow line 35. Between the upper and lower chamber, a valve seat 34 is defined as shown in more detail in FIG. 3. The base of the valve is rigidly coupled by means of a screw connection 31 to the lower beam 20. The screw connection permits pre-setting a desired spacing. Above the valve is an actuating mechanism 40 comprising a cylinder 42 in which is disposed a piston 41. The piston has a rod rigidly coupled to the intermediate platen 28. For closing off the valve seat 34 between the chambers 32 and the upper chamber is a plate 33 which is mechanically coupled to the cylinder 42.

The device can best be understood by describing its operation. When starting up platens 27 and 28 are disposed downward and plate 33 is resting on valve seat 34. Pressure is applied to the pressure vessels 15 by means of the pump 7 pushing hydraulic fluid through the valve 30 and associated pipelines. This raises the platens 27 and 28 causing the material 4 to become compressed. When compression exceeds a pre-determined amount, the piston 41 reaches the top of the cylinder 42 causing the cylinder and the sealing disc 33 attached thereto to rise, lifting it off the seat 34. This is adjusted to occur at a pre-determined compression. As the seat lifts off, hydraulic fluid can flow into the upper chamber and through the return line 35, relieving the pressure. As the pressure is relieved slightly, the sealing disc 33 again makes contact with the seat 34 and a pressure increase occurs. An equilibrium is reached about this point and the proper pressure and spacing maintained. Thus, the thickness of the strip 4 is properly controlled. The valve 30 is in effect a calibrating or control device. It should be noted at this point that such control could be carried out simply with a direct mechanical connection between the platen 28 and the disc 33. In other words, thus far, the unit 40 has been considered to be basically a rigid member. The manner in which this unit 40 acts as a safety device will now be described.

As illustrated, the piston and cylinder are vertically aligned along the same axis as the spindle 31 of the valve 30. The cylinder space 43 is supplied with a hydraulic pressure medium by the pump 44 over a line 45. This pump maintains a constant pressure in the space 43. The line 45 is also coupled to a pressure relief valve 46.

Under normal conditions the piston is driven all the way up against the top of the cylinder as shown in FIG. 2. Thus, the safety device 40 acts as a rigid force transmitting member, coupling the disc 33 to the platen 28. Dynamic equilibrium is maintained in the manner described above.

However, should the strip 4 for any reason suddenly present a greater resistance to compression, thus forcing the pressure platens 26 and 27 apart and holding the disc 33 against the seat 34, a pressure rise in the pressure vessels 15 can occur. Were nothing further done, this could result in severe damage to the apparatus causing over-stressing or rupturing of hydraulic lines. However, with the present invention, this rise in pressure is sensed by the element 40. It must, in opposition to this pressure, attempt to hold the sealing disc 33 against the seat 34. Thus, there is an increased pressure on the piston 41 and the pressure of the hydraulic fluid in the space 43 rises. In other words, there is a tendency to push the piston downward to expel the hydraulic fluid from the chamber 43. The relief valve 46 is set so that, at a pre-determined pressure, it opens and permits expulsion of fluid. In other words, it permits the piston 41 to be pushed downward, expelling fluid which will be discharged through the valve 46. This, in effect, allows the platens 27 and 28 to be lowered until the maximum desired pressure point set at relief valve 46 is reached. At this limiting pressure value, an equilibrium is again established.

Once the disturbance has passed, the piston will again move fully upward pushing the disc 33 against the seat 34 and holding it there again until the platen is raised to the place where normal dynamic regulation takes place in the manner described above. Once again, the safety device 40 becomes a rigid element simply transmitting a position indication from the platen 28 to the disc 33. In other words, the system now acts as a positioning control. However, in the case of an excess pressure, the valve 30 and safety device 40 cooperate to act as a pressure control, limiting the pressure to a pre-determined amount regardless of the thickness of the strip. In other words, the pressure pre-set by means of the relief valve 46 cannot be exceeded. Thus, a small section of the strip 4 being formed may have increased thickness. However, damage to the machine is avoided.

Thus, an improved safety device for a press has been shown. Although a specific embodiment has been illustrated and described, it will be obvious to those skilled in the art that various modifications may be made without departing from the spirit of the invention which is intended to be limited solely by the appended claims.

I claim:

1. In a press having two press platens, each of which is supported on an external support construction wherein the force from one press platen is transmitted to its corresponding support construction through a pressure fluid within pressure elements positioned between the platen and its corresponding support construction, means for maintaining proper positioning of the press platens during normal operation and for relieving excess pressures in the press comprising:

a. means rigidly coupling the support constructions associated with each of said two press platens;

b. means coupled to the support construction associated with said pressure element and to one press platen for sensing deviations of said press platen from a pre-determined position and for regulating the pressure element so as to maintain said one press platen at said pre-determined position during a pressing operation; and c. means for limiting the pressure of the pressure fluid at a pre-determined pressure while preventing an increase of spacing of the pressure platens over that necessary to prevent said pre-determined pressure from being exceeded.

2. Apparatus according to claim 1 wherein said means for sensing and regulating comprises a valve having one portion coupled to said one press platen and another portion coupled to its associated support construction and wherein said safety device comprises means, mechanically in series with said valve between said one press platen and corresponding support structure, acting as a rigid force transmitting element up to said predetermined pressure in said pressure element but yielding when said pre-determined pressure is exceeded due to an excess of force.

3. Apparatus according to claim 2 wherein said safety device is interposed between said press platen and said valve.

4. Apparatus according to claim 2 wherein said safety device comprises a hydraulic piston and cylinder and means maintaining a pre-determined pressure within the said cylinder whereby if said pre-determined pressure is exceeded, said piston will move in said cylinder causing said safety device to yield.

5. Apparatus according to claim 4 wherein said means maintaining a pressure comprises means supplying said cylinder with fluid at a constant pressure and a pressure relief valve adjusted to said pre-determined pressure.

* * * * *